(12) United States Patent
De Mola

(10) Patent No.: US 12,157,432 B2
(45) Date of Patent: Dec. 3, 2024

(54) VEHICLE SECURITY DEVICE WITH PRIMARY ALARM AND DISPLAY ALARM

(71) Applicant: Microchip Technology Incorporated, Chandler, AZ (US)

(72) Inventor: Carmelo Angelo De Mola, Ettlingen (DE)

(73) Assignee: Microchip Technology Incorporated, Chandler, AZ (US)

( * ) Notice: Subject to any disclaimer, the term of this patent is extended or adjusted under 35 U.S.C. 154(b) by 223 days.

(21) Appl. No.: 17/964,188

(22) Filed: Oct. 12, 2022

(65) Prior Publication Data

US 2023/0303031 A1    Sep. 28, 2023

Related U.S. Application Data

(60) Provisional application No. 63/323,702, filed on Mar. 25, 2022.

(51) Int. Cl.
*B60R 25/10* (2013.01)
*B60R 25/104* (2013.01)

(52) U.S. Cl.
CPC ........ *B60R 25/1004* (2013.01); *B60R 25/104* (2013.01)

(58) Field of Classification Search
CPC .......................... B60R 25/1004; B60R 25/104
See application file for complete search history.

(56) References Cited

U.S. PATENT DOCUMENTS

| 4,638,293 | A | * | 1/1987 | Min | H05K 11/02 340/426.34 |
|---|---|---|---|---|---|
| 4,975,678 | A | * | 12/1990 | Hwang | B60R 25/1004 340/426.25 |
| 7,866,861 | B2 | * | 1/2011 | Alexander | G09F 13/22 362/503 |
| 9,592,795 | B1 | * | 3/2017 | Whiteside | G01S 19/13 |
| 9,855,890 | B2 | * | 1/2018 | James | B60K 35/10 |
| 2004/0041689 | A1 | * | 3/2004 | DeBono | B60R 25/066 340/5.52 |
| 2008/0051996 | A1 | * | 2/2008 | Dunning | G08B 15/00 701/1 |
| 2008/0169913 | A1 | * | 7/2008 | Yu | B60R 25/104 70/211 |
| 2009/0134986 | A1 | * | 5/2009 | Bauer | B60R 25/104 340/426.23 |
| 2014/0022066 | A1 |  | 1/2014 | Richardson | 340/426.17 |
| 2017/0158056 | A1 | * | 6/2017 | Takamatsu | G02B 27/0101 |
| 2018/0186331 | A1 | * | 7/2018 | Dubal | B60R 13/10 |

(Continued)

FOREIGN PATENT DOCUMENTS

GB          2249649 A      5/1992

OTHER PUBLICATIONS

International Search Report and Written Opinion, Application No. PCT/US2023/015731, 12 pages.

*Primary Examiner* — Carl C Staubach
(74) *Attorney, Agent, or Firm* — SLAYDEN GRUBERT BEARD PLLC

(57) ABSTRACT

A system having a theft event sensor; a primary alarm actuator; a display alarm actuator; and a vehicle security device to: receive a theft event signal from the theft event sensor, transmit a primary alarm signal to the primary alarm actuator, and transmit a display alarm signal to the display alarm actuator.

17 Claims, 7 Drawing Sheets

(56) References Cited

U.S. PATENT DOCUMENTS

| | | | |
|---|---|---|---|
| 2021/0229629 A1* | 7/2021 | Ghannam | B60R 25/1004 |
| 2022/0041131 A1* | 2/2022 | Lee | B60R 25/102 |
| 2024/0075870 A1* | 3/2024 | Prey | B60Q 1/324 |

* cited by examiner

VEHICLE SECURITY DEVICE WITH PRIMARY ALARM AND DISPLAY ALARM

RELATED APPLICATION

This application claims priority to commonly owned U.S. Provisional Patent Application No. 63/323,702 filed Mar. 25, 2022, the entire contents of which are hereby incorporated by reference for all purposes.

TECHNICAL FIELD

The present disclosure relates to systems and methods for automobile theft prevention (vehicle burglar alarms) including distributed visual alarm warnings to the vehicle's surrounding environment, and in particular, relates to a vehicle security device with a primary alarm and a display alarm.

BACKGROUND

Early conventional vehicle anti-theft systems were installed on the vehicle by the owner. Later, anti-theft systems became standard equipment by original equipment manufacturers (OEMs) for vehicles. These systems enable an alarm when a sensor is triggered to detect a theft. However, some thieves familiar with vehicle anti-theft systems may quickly disable the alarm so as to successfully steal the vehicle. Typical vehicle alarm systems emit a high-volume sound and flash lights through a single actuator that can be easily taken out of service; additionally, acoustic and light warnings have become so ubiquitous, their effectiveness has diminished as theft deterrents.

There is a need for a vehicle anti-theft system having a primary alarm system and a secondary alarm system that automatically notifies persons in the immediate vicinity of a stolen vehicle that the vehicle is being stolen without the perpetrator becoming aware of the notifications.

SUMMARY

According to one aspect, there is provided a system having a theft event sensor; a primary alarm actuator; a display alarm actuator; and a vehicle security device to: receive a theft event signal from the theft event sensor, transmit a primary alarm signal to the primary alarm actuator, and transmit a display alarm signal to the display alarm actuator.

Another aspect provides a system having: theft event sensors; a vehicle sound alarm actuator; vehicle display actuators; a vehicle security device in direct or indirect signal communication with the vehicle event sensors, the vehicle sound alarm actuator, and the vehicle display actuators; and a non-transitory, machine-readable medium including instructions wherein the instructions, when loaded and executed by the vehicle security device, configure the vehicle security device to: detect a theft event signal from the theft event sensors; transmit a primary alarm signal to the primary sound alarm actuator; and instruct the central computer to transmit a display alarm signal to the display alarm actuators.

According to a further aspect, there is provided a method comprising: sensing a vehicle theft event; detecting a theft event signal from a theft event sensor; transmitting a primary alarm signal to a primary alarm actuator; actuating the primary alarm actuator; instructing the central computer to display a visual alarm signal to the vehicle's display actuators

DESCRIPTION OF THE DRAWINGS

The figures illustrate example methods and systems for detecting an ongoing theft of a vehicle, activating a primary alarm of the vehicle horn and lights, and activating a display alarm of a "STOLEN VEHICLE" message to the vehicle surroundings.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

A vehicle anti-theft system may include any display implementation that shows written messages in any human language that are generated by the vehicle LED/OLED matrixes, projectors, or heads-up displays, and informs the surrounding environment of an on-going vehicle theft, without alerting the perpetrator of the theft.

One aspect adds to a vehicle anti-theft system additional distributed visual alarm. The system has a primary alarm and a visual alarm, wherein the primary alarm may comprise an audible horn and flashing headlights and running lights. The additional visual alarm may comprise a display of a legible message. The additional visual alarm may be hard to disable (as it may be a part of the standard vehicle's light system) and that notifies to the surrounding environment that a theft is being attempted, while the stolen vehicle is moving, which could help to create more awareness of the on-going crime and could motivate witnesses to act to notify police or take other measures to foil the theft. Informing the surrounding environment of an ongoing theft only while the vehicle is moving prevents the thief inside the vehicle realizing that the vehicle is sharing a silent visual alarm signal to the outside environment that can correspondingly react to it.

An aspect uses the vehicle infrastructure that is already planned to be used in future vehicles (2025+) and adds a new vehicle-to-human (vehicle2x) communication feature (where in this context x represents humans in the vehicle's surrounding environment). It evolves the capability of the vehicle to act as a human-machine interface, wherein each vehicle in transit on a busy road interacts with other drivers and pedestrians through sounds and visual effects. Therefore, the vehicle itself can also be seen as a human-machine interface to increase the safety and security of the vehicle showing a silent visual alarm message during an attempted vehicle theft without adding costs to the vehicle bill of materials.

Figure 1:
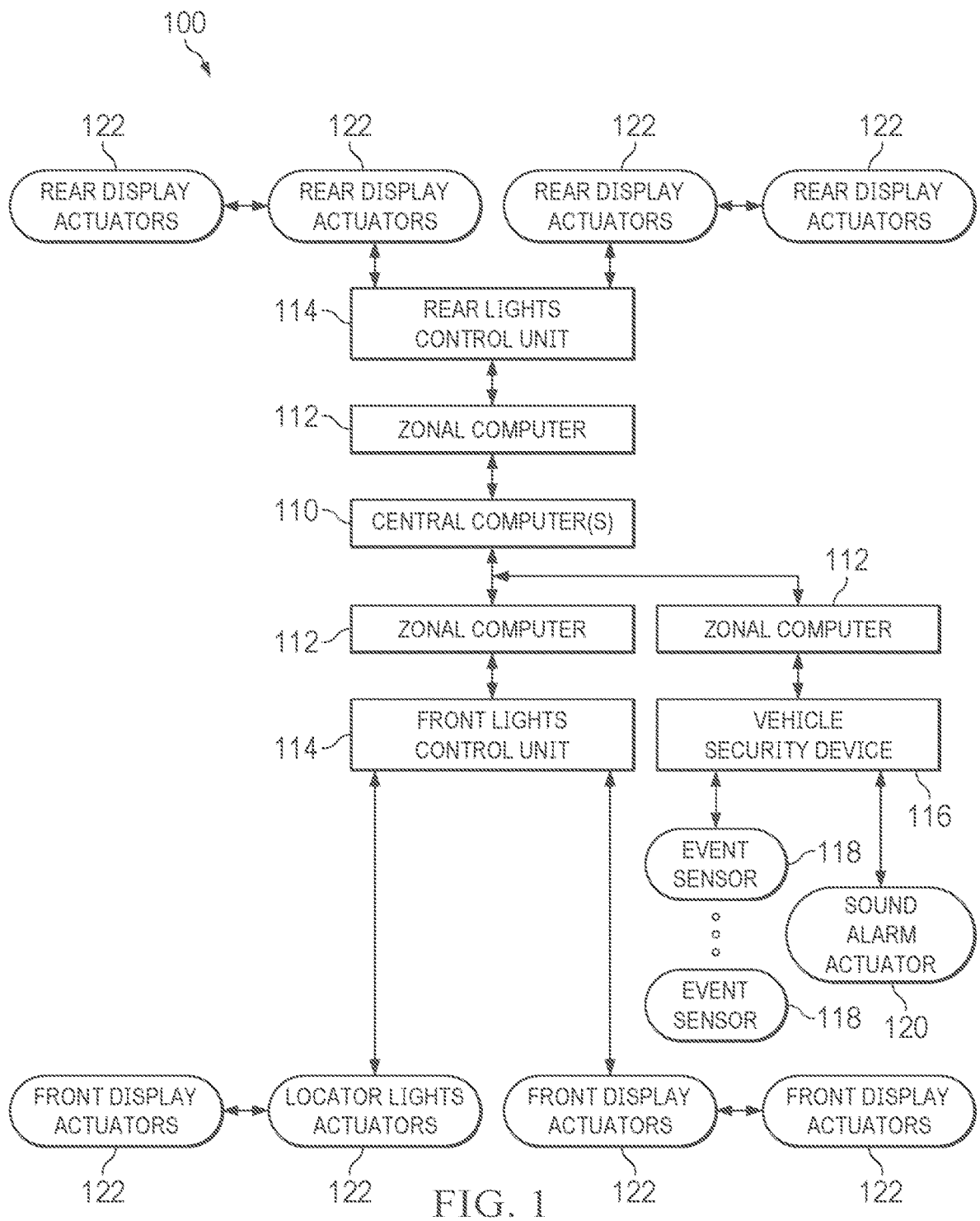
FIG. 1 shows a schematic of a vehicle anti-theft system, wherein a central computer communicates with zonal computers, and the zonal computers communicate with alarm actuators and theft sensors.

FIG. 1 shows a block diagram of a vehicle zonal architecture 100 consisting of a central computer 110 (that may have a redundancy) that is connected over a backbone with different zonal computers 112. The zonal computers 112 supervise different specific functionalities in the vehicle and are in turn connected with specialized control units 114 that supervise specific functions like controlling the lights, or ensuring the security of a vehicle, or perform other specific tasks. Specifically to this application, if the vehicle user activates the vehicle alarm system, a vehicle security device 116 supervises the security of the vehicle with different event sensors 118 that monitor the vehicle integrity and detect all attempts of a theft monitoring e.g., the illicit opening of doors, the breaking of windows, the illicit introduction inside the vehicle, or the illicit attempt to start the engine, or the illicit attempt to move the vehicle (theft detection). In case of a successful theft detection the vehicle security device 116 activates the primary vehicle alarm system (sound alarm actuator 120 and display actuators 122). The activation of the sound alarm is performed over a direct wired connection, as the sound alarm actuator 120 is directly wired with the vehicle security device 116, the activation of the display actuators 122 is triggered through a network event over the central computer 110 that controls all vehicle lights. Additionally, the vehicle security device 116 informs also with a network event the central computer 110 of the theft attempt (see algorithm in FIG. 2). All logical connections in FIG. 1 may be bidirectional, as the communication within the different zonal computers 112 may be guaranteed between all zonal computers 112. Additionally, the sensors and actuators shown may offer diagnosis features that require a bidirectional communication.

FIG. 1 shows a schematic of a vehicle anti-theft system, wherein a central computer communicates with zonal computers, and the zonal computers communicate with task-specific Electronic Control Units (ECUs). In an example of a vehicle security device, the front lights control unit, and the rear lights control unit may be connected to different zonal computers. As a matter of design choice, the above listed ECUs may be connected to a single zonal computer, or may show a different connection topology with the available zonal computers in the vehicle than as shown in FIG. 1.

Figure 2:
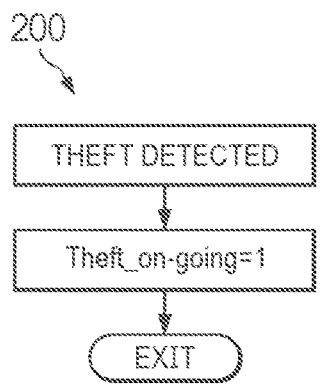
FIG. 2 shows a flow chart of a theft detection algorithm.

With reference to FIG. 2, one aspect consists of a system and a software algorithm 200 that in the case of a detected vehicle theft is able to control the existing vehicle light system that is based on a digital LED (Light-emitting Diode) or an OLED (Organic LED) matrix, which displays distributed visual alarm warnings to the vehicle's surrounding environment. The algorithm may be integrated in the central computer 110 or in the zonal computer 112 supervising the vehicle security device 116. The algorithm may also be integrated in newly produced vehicles, whose E/E architecture (Electrical/Electronic architecture) is based on a zonal architecture. The front lights control unit 114 and the rear light control unit 114 may be connected to two separate zonal computers 112. Alternatively, the front lights control unit 114 and the rear light control unit 114 may be connected to the same zonal computer 112 and may be physically implemented in the same control unit 114. The vehicle security device 116 may share a zonal computer 112 with other control units 114.

Another aspect is a LED/OLED matrix-based vehicle exterior light application for next generation automobiles, vehicles. These devices that are originally planned to be used as exterior lights can also display the silent alarm, as described above. The signal transmission from the central computer 110 and the zonal computers 112 to the exterior lights could be implemented e.g., with a 10BASE-T1S-based control network that could be used to connect the control units 114 with the corresponding display actuators 122 (LED/OLED Matrices). Components such as LAN867X, LAN865X, by Microchip Technology Corporation can be used to connect different nodes in a 10BESE-T1S network.

Referring to FIG. 2, an algorithm 200 controlling the silent/visual alarm system may be implemented in the central computer 110, a zonal computer 112, or a control unit 114, as a matter of design choice. With this kind of implementation, the silent/visual alarm system is designed as a distributed alarm system, as the theft detection is supervised by the vehicle security device 116, but the activation of the silent/visual alarm is performed by the central computer 110 or a zonal computer 112. This will be made possible by a network event message that will notify the central computer 110 of the theft attempt. If the vehicle alarm system is active and a theft is detected, the central computer (with or without redundancy) or zonal computer may be (eventually partially) woken-up and will be notified of the theft event by a network message, which may include setting Theft_on-going to 1. FIG. 2 describes the algorithm 200 managing the setting of a theft event in the central computer 110 shown in FIG. 1.

Figure 3:
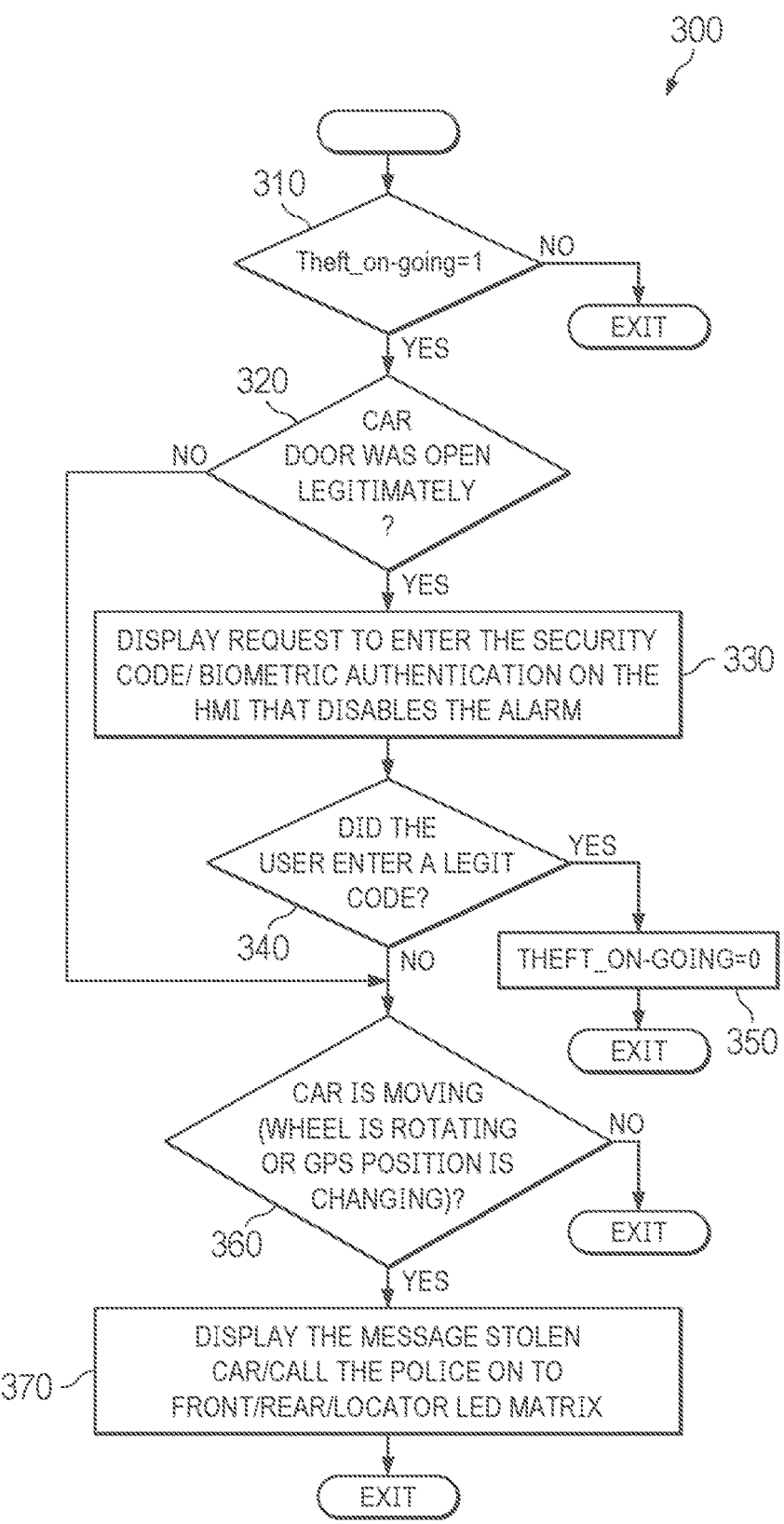
FIG. 3 illustrates a flow chart of a theft detection and alarm display algorithm.

Referring to FIG. 3, an algorithm 300 controlling the silent/visual alarm system may be implemented in the central computer 110, a zonal computer 112, or a control unit 114, as a matter of design choice. The flag "theft_on-going" set 310 to 1 may trigger back, front, and the optional locator lights to display the message "stolen car," and in one case the message is only shown if the vehicle is moving and a legitimate user has not disabled the alarm signal. The message "stolen car" may be integrated with the message "call the police," wherein both messages may flash alternatively. The flashing message "stolen car/call the police" may stay always active when the vehicle is in motion, until the flag "theft_ongoing" is reset to 0. The flag "theft_on-going" can be reset to 0 with a password or any biometric identification entered over the vehicle human-machine interface. The password (or hash for the biometric identification) may be stored in one of the vehicle's computers using cryptographic hardware like the Microchip TrustAnchor (TA100) or software technics. If the value of the flag "theft_on-going" is equal to 1 and any vehicle door is opened with any legitimate vehicle unlocking method, the vehicle's human-machine interface may signal to the user that a theft attempt took place and that the distributed vehicle alai in system will show the "stolen car" message, until it is deactivated entering the password/finger print over the vehicle's human-machine interface. The algorithm 300 may determine whether a car door was opened legitimately 320. If YES, the algorithm 300 displays 330 a request to enter the security code, biometric authentication on the human machine interface that disables the alarm. If a code is entered, the algorithm 300 decides 340 whether the user entered a legit code. If YES, value of the flag "theft_on-going" is set 350 equal to 1, and if NO, the algorithm 300 determines 360 whether the car is moving (wheel is rotating or GPS position is changing). At step 320, if the car door was determined to have not been opened legitimately, the algorithm 300 advances directly to step 360. If step 360 determines the car is moving, YES, then the algorithm 300 displays 370 the message STOLEN CAR or CALL POLICE on an LED matrix.

Figure 4:
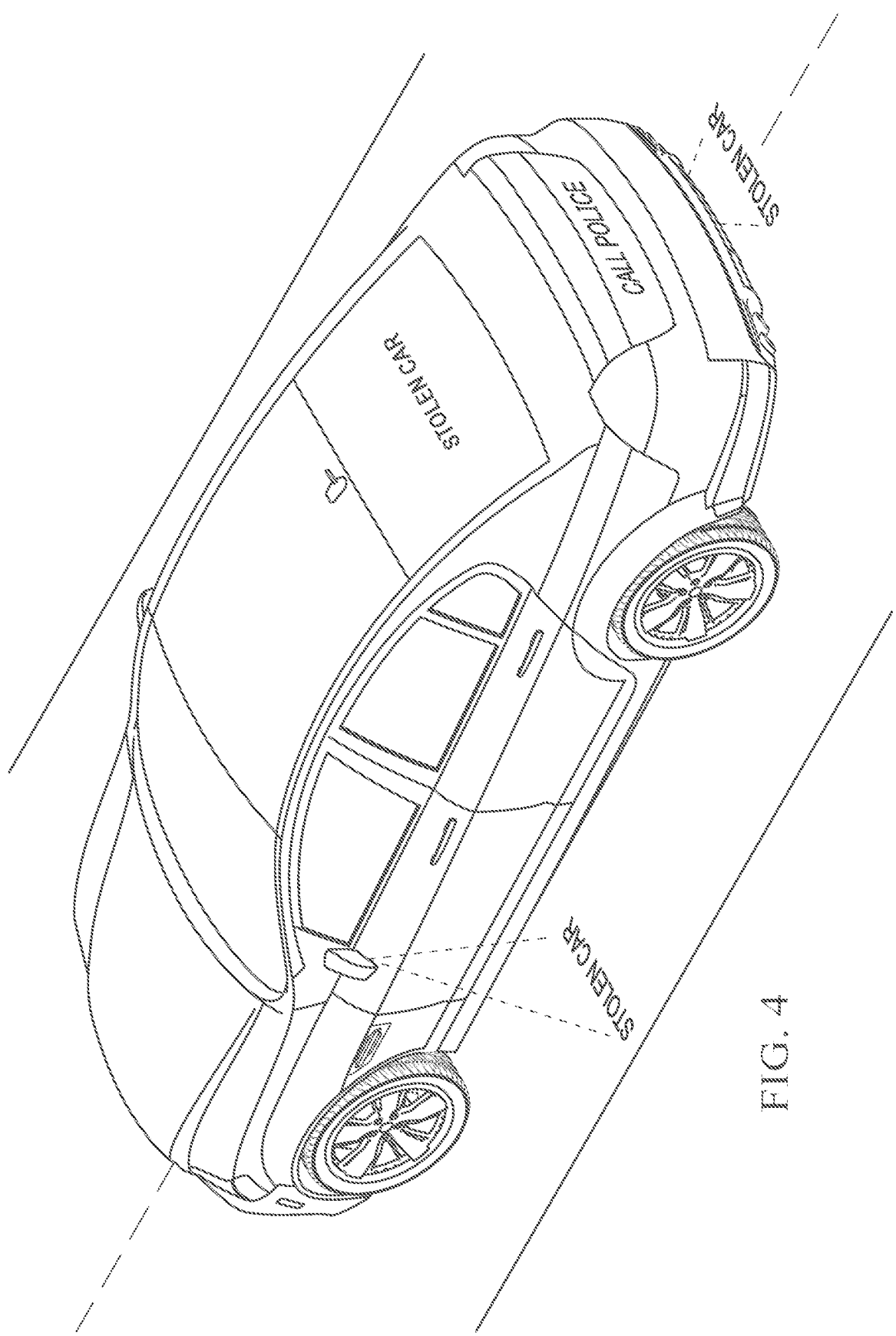
FIG. 4 shows a perspective view of a rear end of a vehicle wherein alarm displays are on the vehicle itself or projected onto surfaces in the immediate vicinity of the vehicle.

FIG. 4 illustrates a rear perspective view of a vehicle after an alarm is triggered. In a case of a detected theft, the rear LED matrix panels may show information, i.e., "stolen car," when the vehicle is moving. FIG. 4 shows the stolen vehicle message only in the center, where the driver of the vehicle is unable to view the message. The message may flash alternatively with the message "call the police." In case of theft, the optional locator lights on the vehicle's side may project the information "stolen car" on the road surface. This message may flash alternatively with the message "call the police."

Figure 5A:
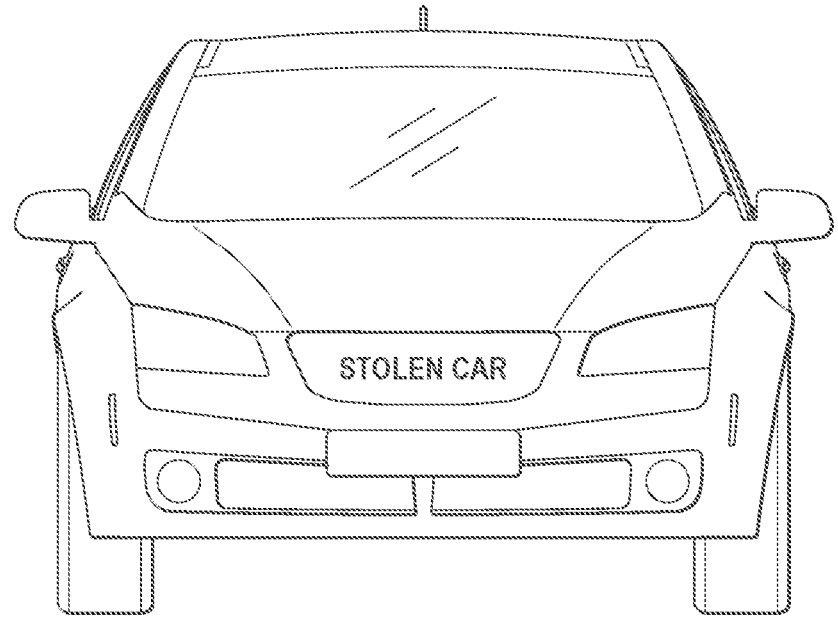
FIG. 5A shows a front view of a vehicle with an alarm display in a grille of the vehicle.

FIG. 5A shows a front view of a vehicle with an LED matrix display in a front grill, and illustrates an example of a front view of a vehicle after an alarm is triggered. In case of a detected theft, the central LED matrix panel on the front of the vehicle will show the information "STOLEN CAR" when the vehicle is moving. This message may flash alternatively with the message "CALL THE POLICE."

Figure 5B:
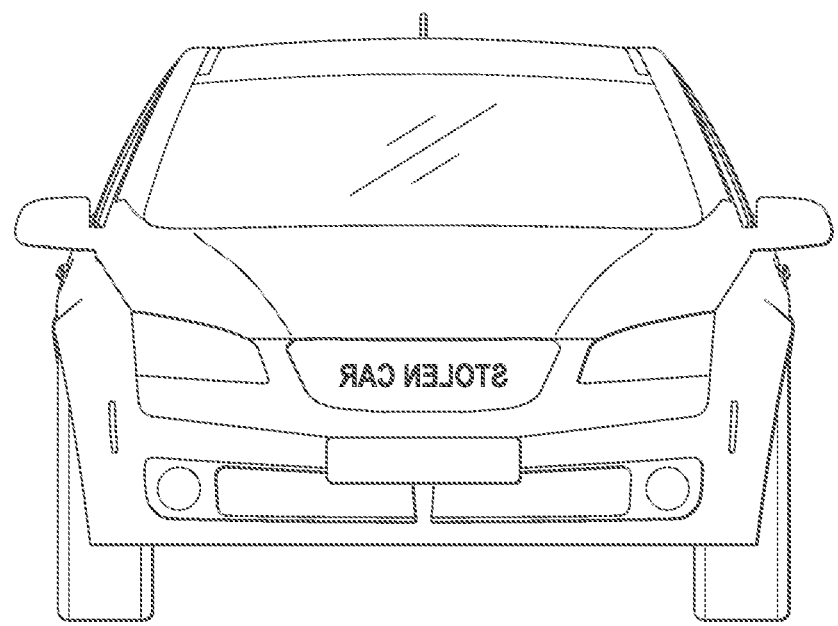
FIG. 5B shows a front view of the vehicle of FIG. 5A, wherein text shown in the display is spelled backwards.

FIG. 5B shows a front view of the vehicle of FIG. 5A, wherein text shown in the display is spelled backwards. In this example, the text "STOLEN CAR" is displayed backwards so that it may be properly read by a driver in a car travelling in front of the displayed car when the driver views the display via a rear view mirror. The message text may flash alternatively between a forward spelling (FIG. 5A) and a backward spelling (FIG. 5B).

Figure 6:
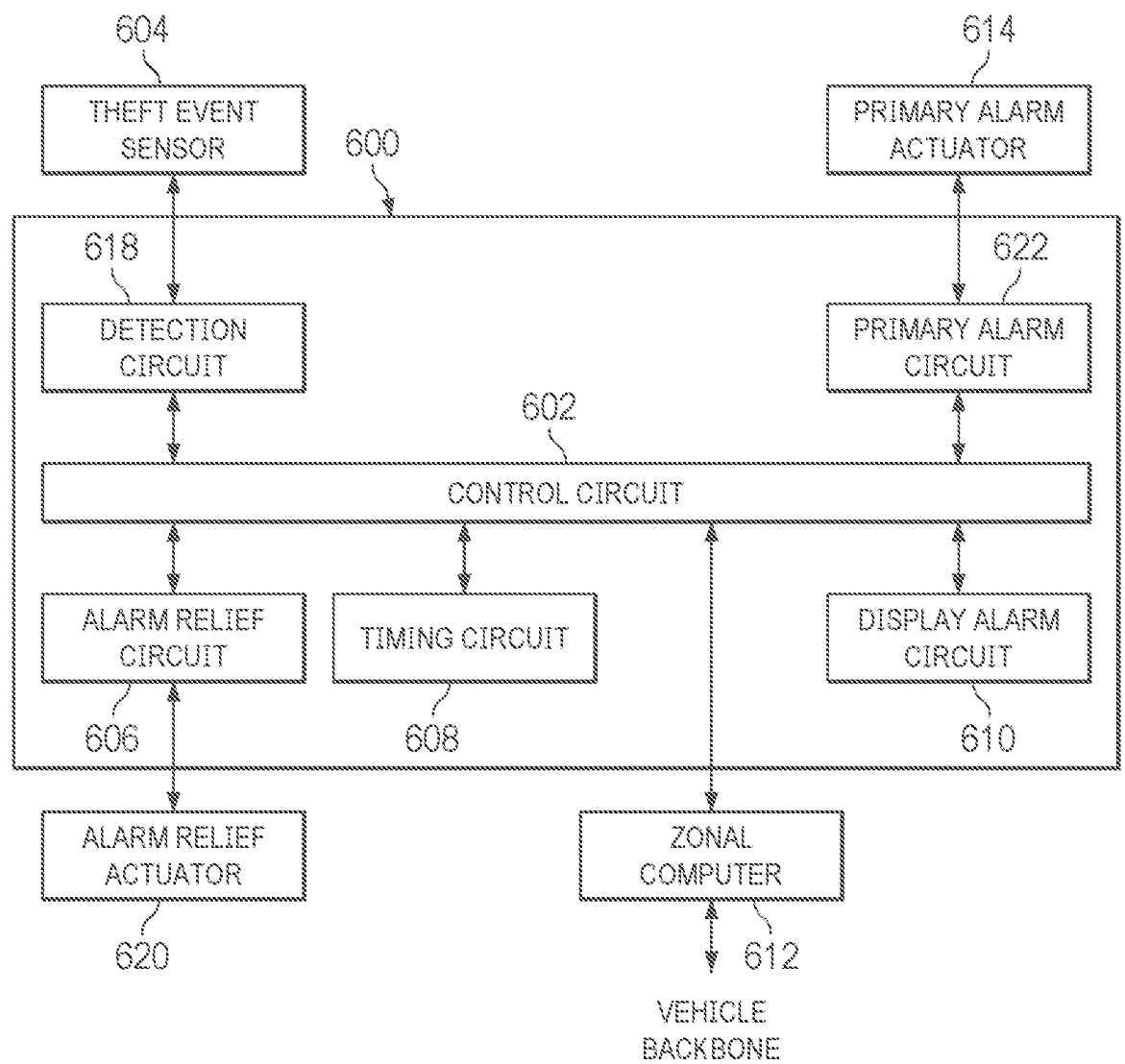
FIG. 6 illustrates a schematic diagram showing a vehicle security device, with a control circuit, a detection circuit, an alarm relief circuit, a timing circuit, a display alarm circuit, and a primary alarm circuit.

FIG. 6 illustrates a schematic diagram showing a vehicle security device 600. The vehicle security device 600 comprises a control circuit 602, a detection circuit 618, an alarm relief circuit 606, a timing circuit 608, a display alarm circuit 610, and a primary alarm circuit 622. The control circuit 602 is coupled to the detection circuit 618, the alarm relief circuit 606, the timing circuit 608, the display alarm circuit 610, and the primary alarm circuit 622. The control circuit 602 may be coupled to a zonal computer 612, which sits in the vehicle backbone. In one aspect, the control circuit 602, the detection circuit 618, the display alarm circuit 610 and the primary alarm circuit 622 may be integrally configured in one housing to form the vehicle security device 600. The control circuit 602 may be, for example but not limited to, a micro-controller or a micro-processer. In this aspect, a user may install the vehicle security device 600 at any proper position inside or outside the vehicle. In another aspect, the control circuit 602, the detection circuit 618, the display alarm circuit 610, and the primary alarm circuit 622 of the vehicle security device 600 may be separate components. An alarm relief circuit 606 may be coupled to the control circuit 602 to allow the alarm to be deactivated or turned OFF. The alarm relief circuit 606 may be coupled to an alarm relief actuator 620, which deactivates the alarm actuators. In this aspect, the user can install the separate components at positions inside or outside the vehicle. Alternatively, components or circuits may be partially integrated and partially separated.

As shown in FIG. 6, the detection circuit 618 is in communication with theft event sensors 604. The detection circuit 618, responsive to theft event sensor 604, detects at least one theft indicating event of the vehicle e.g., illicitly opened door, broken window, illicit movement of the vehicle, illicit attempt to start or control the engine. The event sensors can be, for example but not limited to a collection of, a vibration sensor, a hall sensor, a pressure sensor, a gyroscope, or a Global Positional Satellite device, without limitation. A detected theft indicating event may be, for example but not limited to, vehicle displacement, vehicle motion, vehicle acceleration, door opening, vehicle seat occupied, or illegitimate ignition, or illegitimate attempt to operate any kind of vehicle control including the vehicle's human machine interface without limitation. For example, when the vehicle moves, it may trigger the theft event sensor 604 (vibration sensor, gyroscope or GPS device) to output a signal to the detection circuit 618, and in response the detection circuit 618 may determine that a theft indicating event is detected. Also, when the door is illicitly opened, it may trigger the theft event sensor 604 (vibration sensor and/or Hall sensor) to output a signal to the detection circuit 618, and in response the detection circuit 618 may determine that a theft indicating event is detected. Further, when a person is seated in a vehicle seat, the theft event sensor 604 (vibration sensor and/or pressure sensor) may be triggered to output a signal to the detection circuit 618, and in response the detection circuit 618 may determine a theft indicating event is detected. The detection circuit 618 could be integrated in the control circuit 602.

The control circuit 602, in response to determination that the theft indicating event has been detected may output an alarm activation signal to the primary alarm circuit 622 and the display alarm circuit 610. The primary alarm circuit 622, responsive to the alarm activation signal, outputs a signal to the primary alarm actuator 614. The primary alarm actuator 614 may actuate an audible alarm, and a visual alarm, without limitation, as is known in anti-theft systems. For example, the audible alarm may include honking the horn or projecting a recorded message via a speaker, and the visual alarm may include flashing headlights, running lights, backup lights, turn indicator lights, or interior lights. The primary alarm may continue until it is deactivated by a remote control, or a key, or a timer is expired, or entering a password/finger print over the vehicle's human-machine interface via the alarm relief circuit 606. Also, the intensity of the primary alarm outputted by the primary alarm actuator 614 is variable. For example, the warning alarm can be an audible alarm with different volumes, a visual alarm with different light colors or different brightness, or a seat vibration alarm with different vibration intensities.

Further, when the detection circuit 618 detects a theft indicating event, the control circuit 602 transmits the alarm activation signal to the display alarm circuit 610 that could be integrated in the Control Circuit itself. The display alarm circuit 610, in response to the alarm activation signal informs the Central Computer (FIG. 1) of a theft attempt through the Zonal Computer that is connected over the vehicle's backbone to the Control Circuit of the Vehicle Security Device 600. The Central Computer will handle this notification over the algorithm shown in FIG. 2, The Central Computer will consider the theft indicating event to stay active until it is deactivated by entering the password/finger print over the car's human-machine interface.

The alarm relief circuit 606 may accept a relief signal from the Alarm Relief Actuator 620 (e.g., a remote control unit or a key) to relieve the alarm outputted by the primary alarm circuit 622. Specifically, after the primary alarm circuit 622 outputs the respective alarm signal, the vehicle owner of the vehicle or any authorized person may determine the vehicle is not being stolen and resolve the theft indicating event by deactivating the primary alarm system over e.g., a remote control unit or a key. At this point the user is able to enter into the vehicle without that the primary alarm system will go off. After the User has occupied the driver seat, the Vehicle's HMI will ask the user to validate himself by entering a passcode/fingerprint/face recognition/voice recognition/retinal recognition, or using any other available biometric authentication. If the user is able to positively identify himself, the Central Computer will deactivate the visual distributed alarm system by resetting the flag "theft_on_going" (FIG. 3). This two step authentication increases the security of the vehicle, in case of an illicit user being able to override the 1$^{st}$ authentication step and being able to access the vehicle without letting the primary alarm going off.

The vehicle security device 600 may also have a timing circuit 608 to time stamp the theft indicating event, and the alarm activation signal. An authorized person may retrieve the time stamp.

Each of the circuits shown in FIG. 6 may be implemented by instructions in a storage medium for execution by a processor, a function, library call, subroutine, shared library, software as a service, analog circuitry, digital circuitry, control logic, digital logic circuits programmed through hardware description language, application-specific integrated circuit (ASIC), field-programmable gate array (FPGA), programmable logic device (PLD), or any suitable combination thereof, or any other suitable mechanism, whether in a unitary device or spread over several devices.

Figure 7:
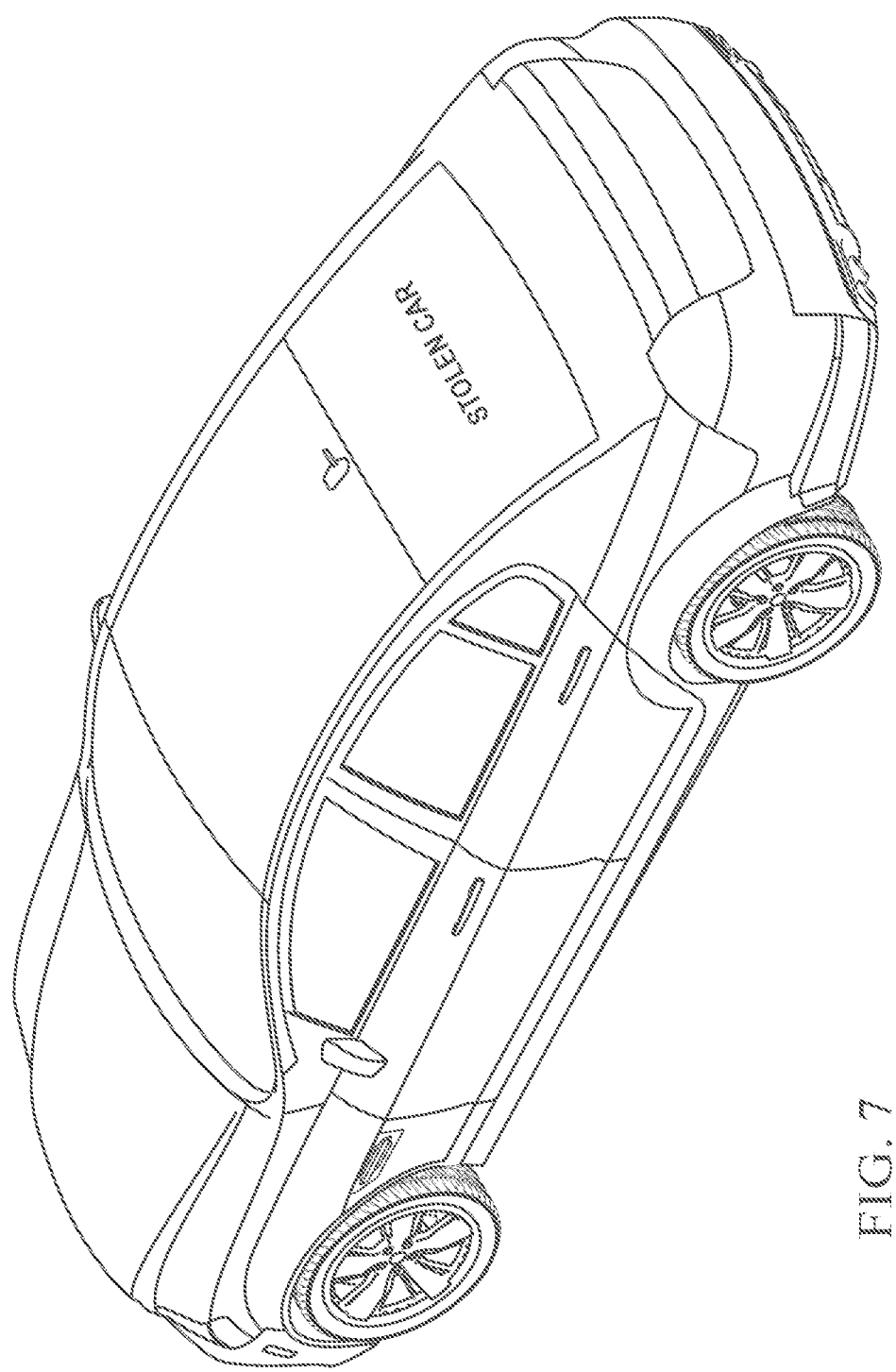
FIG. 7 shows a perspective view of a rear end of a vehicle wherein an alarm display is in a head-up display in the rear window of the vehicle.

FIG. 7 shows a heads-up-display in a rear view window that displays a message to the surroundings outside the vehicle but not to occupants of the vehicle. The heads-up display in the rear-view window (or any other window) may include an organic light emitting diode (OLED) screen positioned in contact with the window. The OLED screen may include a screen portion used to display "stolen car" or "call the police." The transparent screen may allow occupants of the vehicle to see through the window without seeing the display of the message, while persons outside the vehicle may see the display of the message. Alternatively, a camera presentation of a motor vehicle rearward view may be presented on the interior of the display to prevent the occupants of the vehicle from seeing the display of "stolen car" or "call the police" being projected for persons outside the vehicle to see. The rear window of the vehicle may be a substantially transparent window head up display including light emitting particles or microstructures over the glass permitting luminescent display while permitting vision through the window. The head-up display message may be projected on the rear windshield.

The window may be in the form of an insulated glass unit having an electrochromic device, a transparent display, and a controller to control optical states of the electrochromic device and the transparent display. The controller may adjust the transparent display between substantially transparent and substantially opaque optical states. The display may be pixelated to allow text or graphic messages to be displayed. The transparent display may be an organic light emitting diode (OLED) display. An OLED display may display a message to the exterior environment.

The transparent display may be an electrowetting display having a plurality of pixels where each pixel has at least one cell that can be oscillated between a transparent state and an opaque state. The cells may oscillate at frequencies between about 30 Hertz and about 60 Hertz. Pixels may have a cell that may be substantially white (or substantially black) in its opaque state. When the pixels of an electrowetting display can be turned white (or an otherwise light color), the window may include a projector that projects an image onto the electrowetting display. Some of the pixels of an electrowetting display may include cells that provide different colors from one another in their opaque state.

The transparent display in a vehicle window may be a passive coating that is substantially transparent to an observer but reflects projected light to form an image. The window may include a projector that projects an image onto the transparent display. A projector may, in some cases, be located on or within a frame configured to hold the window, or the window may include a light guide that directs the image from the projector to the transparent display.

The head-up display of the rear windshield may be transparent to the occupants inside the vehicle while displaying a message on the exterior of the window to the vehicle surroundings. Alternatively, the head-up display of the rear windshield may be opaque to the occupants inside the vehicle while displaying a message on the exterior of the window to the vehicle surroundings. In either case, the message displayed on the exterior of the window to the vehicle surroundings may, or may not be, readable by the occupants in the vehicle. The head-up display may be completely integrated in the rear windshield.

Figure 8:
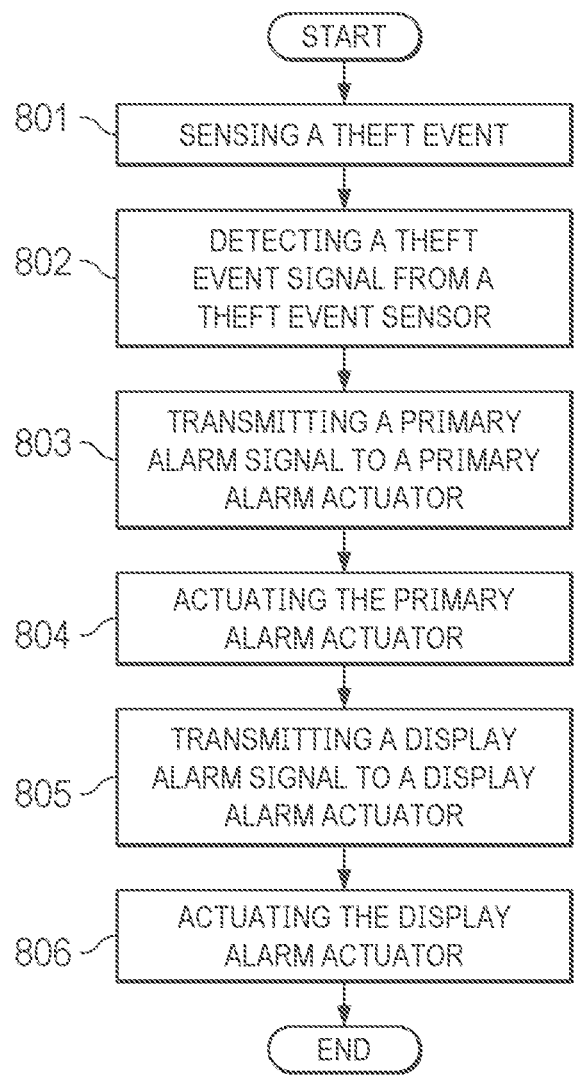
FIG. 8 illustrates a flow chart for an anti-theft vehicle method.

FIG. 8 illustrates a flow chart of a method for providing visual notice to individuals outside the vehicle that a vehicle theft is in progress. The method senses 801 whether a theft event has occurred. When a theft event has been sensed, the method detects 802 a theft event signal from a theft event sensor. The method then transmits 803 a primary alarm signal to a primary alarm actuator. A primary alarm actuator is then actuated 804. The method then transmits 805 a display alarm signal to a display alarm actuator. A display alarm actuator is then actuated 806.

The Vehicle Security Device is connected to the vehicle's backbone Network and has the possibility to communicate with the other network nodes Although examples have been described above, other variations and examples may be made from this disclosure without departing from the spirit and scope of these disclosed examples.

The invention claimed is:

1. A system comprising:
a theft event sensor;
a primary alarm actuator;
a display alarm actuator; and
a vehicle security device to:
receive a theft event signal from the theft event sensor,
transmit a primary alarm signal to the primary alarm actuator, and
transmit a display alarm signal to the display alarm actuator, wherein the display alarm actuator comprises a projector of an alarm display from a vehicle to a surface not part of the vehicle.

2. The system as claimed in claim 1, wherein the theft event sensor is a vibration sensor, a hall sensor, a pressure sensor, a gyroscope, or a GPS device.

3. The system as claimed in claim 1, wherein the theft event sensor is a vehicle displacement sensor, a vehicle motion sensor, a vehicle acceleration sensor, a door opening sensor, a vehicle seat occupation sensor, or an illegitimate ignition sensor.

4. The system as claimed in claim 1, wherein the primary alarm actuator is an audible alarm or a visual alarm, wherein the audible alarm is a horn or a speaker, and wherein the visual alarm is a headlight, a running light, a backup light, a turn indicator light, or an interior light.

5. The system as claimed in claim 1, wherein the display alarm actuator comprises at least an LED or OLED matrix display on an exterior of a vehicle.

6. The system as claimed in claim 1, wherein the display alarm actuator comprises a heads-up display in a window of a vehicle.

7. The system as claimed in claim 1, comprising an alarm relief actuator, wherein the vehicle security device is in communication with the alarm relief actuator to receive an alarm relief signal from the alarm relief actuator.

8. The system as claimed in claim 1, wherein the vehicle security device comprises:
   a detection circuit to receive a theft event signal from the theft event sensor;
   a primary alarm circuit to transmit a primary alarm signal to the primary alarm actuator;
   a display alarm circuit to transmits a display alarm signal to the central computer; and
   a control circuit in communication with the detection circuit, the primary alarm circuit, and the display alarm circuit.

9. A system comprising:
   a theft event sensor;
   a primary alarm actuator;
   a display alarm actuator;
   a vehicle security device in signal communication with the theft event sensor, the primary alarm actuator, and the display alarm actuator; and
   a non-transitory, machine-readable medium including instructions wherein the instructions, when loaded and executed by the vehicle security device, configure the vehicle security device to:
   detect a theft event signal from the theft event sensor;
   transmit a primary alarm signal to the primary alarm actuator; and
   transmit a display alarm signal to the display alarm actuator, wherein the display alarm actuator comprises a projector of an alarm display from a vehicle to a surface not part of the vehicle.

10. The system as claimed in claim 9, wherein the vehicle theft event sensor is a sensor selected from a vibration sensor, a hall sensor, a pressure sensor, a gyroscope, or a GPS device.

11. The system as claimed in claim 9, wherein the primary alarm actuator is a horn, a speaker, a headlight, running light, backup light, turn indicator light, or interior light.

12. The system as claimed in claim 9, wherein the display alarm actuator comprises an LED or OLED matrix display on an exterior of the vehicle.

13. The system as claimed in claim 9, wherein the display alarm actuator comprises a heads-up display in a window of a vehicle.

14. The system as claimed in claim 9, wherein the vehicle security device comprises:
   a detection circuit that receives a theft event signal from the vehicle theft event sensor;
   a primary alarm circuit that transmits a primary alarm signal to the primary alarm actuator;
   a display alarm circuit that transmits a display alarm signal to the display alarm actuator; and
   a control circuit in communication with the detection circuit, the primary alarm circuit, and the display alarm circuit.

15. A method comprising:
   sensing a vehicle theft event;
   detecting a theft event signal from a theft event sensor;
   transmitting a primary alarm signal to a primary alarm actuator;
   actuating the primary alarm actuator;
   transmitting a display alarm signal to a display alarm actuator; and
   actuating the display alarm actuator, wherein the display alarm actuator comprises a projector of an alarm display from a vehicle to a surface not part of the vehicle.

16. The method as claimed in claim 15, comprising:
   processing the theft event signal with a vehicle security device;
   generating the primary alarm signal with the vehicle security device; and
   generating the display alarm signal with the vehicle security device.

17. The method as claimed in claim 15, relieving the primary alarm actuator or the display alarm actuator.

* * * * *